US007159976B2

(12) United States Patent
Kawamura et al.

(10) Patent No.: US 7,159,976 B2
(45) Date of Patent: Jan. 9, 2007

(54) WATER BASE INK SET FOR INK-JET RECORDING

(75) Inventors: Masateru Kawamura, Toyoake (JP); Narumi Koga, Nagoya (JP); Naomichi Kobayashi, Nagoya (JP); Hideo Ohira, Tajimi (JP); Shunichi Higashiyama, Yotsukaichi (JP); Masaya Fujioka, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/251,166

(22) Filed: Sep. 19, 2002

(65) Prior Publication Data

US 2003/0189627 A1  Oct. 9, 2003

(30) Foreign Application Priority Data

Sep. 26, 2001  (JP) .............................. 2001-293940

(51) Int. Cl.
*B41J 2/17* (2006.01)
*G01D 11/00* (2006.01)

(52) U.S. Cl. ...................... 347/100; 347/95; 106/31.13

(58) Field of Classification Search ................ 347/100, 347/96, 95, 98, 101; 106/31.13, 31.6, 31.27; 523/160
See application file for complete search history.

(56) References Cited

U.S. PATENT DOCUMENTS

| 5,053,078 | A | * | 10/1991 | Koike et al. ................. 347/100 |
| 5,085,698 | A | * | 2/1992 | Ma et al. ..................... 524/388 |
| 5,257,036 | A | * | 10/1993 | Koike et al. ................. 347/100 |
| 5,428,383 | A | * | 6/1995 | Shields et al. |
| 5,707,433 | A | * | 1/1998 | Kuge et al. .................. 347/100 |
| 6,087,196 | A | * | 7/2000 | Sturm et al. ................. 427/466 |
| 6,399,674 | B1 | * | 6/2002 | Kashiwazaki et al. ...... 347/100 |
| 6,652,084 | B1 | * | 11/2003 | Teraoka et al. ............. 347/100 |
| 2003/0146962 | A1 | * | 8/2003 | Ogasawara et al. ......... 347/100 |

FOREIGN PATENT DOCUMENTS

| EP | 0 586 079 B1 | * | 5/1997 |
| JP | 62-101672 | * | 5/1987 |
| JP | 6-106841 | * | 4/1994 |

* cited by examiner

Primary Examiner—Manish S. Shah
(74) Attorney, Agent, or Firm—Reed Smith LLP

(57) ABSTRACT

An ink set for ink-jet recording of the present invention includes a black ink which has a surface tension of not less than 40 mN/m at 25° C., and a color ink which has a surface tension of not less than 40 mN/m at 25° C. The viscosity ratio of the color ink with respect to the black ink is not less than 1.3. The feathering of the ink is avoided, and the bleeding, which would otherwise appear at the boundary between the black ink and the color ink, is avoided.

16 Claims, 3 Drawing Sheets

WATER BASE INK SET FOR INK-JET RECORDING

BACKGROUND OF THE INVENTION

1. Field of the Invention

The present invention relates to a water base ink set for ink-jet recording including a black ink, and an ink-jet recording apparatus which accommodates the same.

2. Description of the Related Art

The ink discharge system, which has been hitherto known as the ink-jet recording method, includes, for example, the electrostatic attraction method, a method in which mechanical vibration or displacement is applied to the ink with a piezoelectric element or the like, and a method in which bubbles are generated by heating the ink to utilize the pressure generated thereby. Ink droplets are formed by means of the ink discharge method as described above, and all or a part of the ink droplets are adhered to a recording objective such as paper to perform the recording. Those known and used as the ink to be employed for the ink-jet recording method as described above include those in which a variety of water-soluble dyes or water-dispersible pigments are dissolved or dispersed in liquid media each comprising water or a combination of water and water-soluble organic solvent.

In order to adequately perform the recording for a long period of time by using the ink as described above, for example, it is necessary to satisfy the following conditions. That is, the characteristic values (for example, those of the viscosity, the surface tension, and the density) of the ink are appropriate values. No deposited matter is generated and no physical property value is changed by the heat or the like (to avoid any clog-up at the nozzle or the orifice of the recording apparatus and discharge the ink stably). The recorded image is excellent, for example, in water resistance and light resistance.

When the recording is performed with an ink-jet printer by using an ordinary water base ink, exclusive ink-jet paper is sometimes used, in order to obtain good printing qualities without involving any blurring of the ink. However, in recent years, it is more demanded to perform the recording on the regular paper rather than the recording on the exclusive ink-jet paper, in view of the running cost and the consideration of the environment.

Further, as for the color of the ink, the color ink-jet printer is overwhelmingly demanded as compared with the monochrome ink-jet printer in the market directed to home use and office use.

However, when the recording is performed on the regular paper, a problem arises such that the printing quality is remarkably deteriorated as compared with the case in which the recording is performed on the exclusive ink-jet paper. For example, the following problem arises. That is, when the ink permeates into the recording paper, then the ink spreads non-uniformly, and the edge of an image portion is notched, making it impossible to obtain any sharp edge of the image portion. This phenomenon is generally called "feathering".

Further, in the case of the color ink-jet printer, another problem arises in addition to the problem described above such that the inks are mixed with each other at the portion (hereinafter referred to as "boundary") at which the different colors are disposed adjacently, and the both inks are blurred, resulting in the deterioration of the printing quality. This phenomenon is generally called "color bleed". The color bleed tends to be conspicuous, for example, especially when letters or lines are recorded with the black ink having a relatively dark color on the background of the color ink, i.e., yellow, magenta, cyan or the like having a relatively bright color.

Many techniques have been used in order to solve the problems as described above, suppress the feathering and the color bleed, and obtain the good printing quality.

At first, in order to reduce the feathering, a method is generally used, in which the surface tension of the ink is increased. The higher the surface tension is, the better the successfully obtained printing quality is, in which the feathering scarcely appears.

A technique, which is used to reduce the color bleed, is a method in which the surface tensions of the color ink and the black ink are lowered so that they are in equivalent degrees (within ±10% of the black ink). In most cases, the surface tension is adjusted to be about 28 to 38 mN/m.

In the case of the ink set having been hitherto used, no special consideration is made for the viscosity of the ink. For example, in view of the discharge stability, the viscosities of the black ink and the color ink are adjusted to be in approximately equivalent degrees.

Unlike the general techniques as described above, it has been suggested in Japanese Patent Application Laid-open No. 6-106841 that a pigment is used for a coloring agent of a black ink, and a precipitating agent is added to a color ink in order to precipitate the black pigment. This suggestion is based on the following method. That is, the black pigment is aggregated and precipitated by using a polyvalent metal salt as the precipitating agent dissolved in the color ink, at the boundary at which the black ink and the color ink make contact with each other. Accordingly, the fluidity of the black pigment in the black ink is suppressed to avoid the color bleed.

As described above, in order to reduce the feathering and the color bleed, the techniques corresponding to the respective cases have been hitherto used.

However, most of the conventional inks as described above have involved the following problem. That is, when the recording is performed on the regular paper, any one or all of the feathering and the color bleed of the black ink and the color ink are caused. It has been impossible to obtain any satisfactory printing quality in which all of them are simultaneously improved.

As described above, there has been the following problem. That is, if the surface tension is about 28 to 38 mN/m as in the conventional ink set, and the viscosity is approximately equivalent to one another in ratio, then the feathering has been unsatisfactory. If it is intended to increase only the surface tension, it has been impossible to satisfy the color bleed. It has been impossible to simultaneously satisfy the requirements for the color bleed and the feathering.

SUMMARY OF THE INVENTION

The present invention has been made in order to solve the problems as described above, an object of which is to provide a water base ink set for ink-jet recording which simultaneously satisfy all of the requirements for the black ink feathering, the color ink feathering, and the color bleed, even when recording is performed on regular paper, and an ink-jet recording apparatus which accommodates the same.

According to a first aspect of the present invention, there is provided an ink set for ink-jet recording, comprising a black ink which-has a surface tension of not less than 40 mN/m at 25° C.; and a color ink which has a surface tension of not less than 40 mN/m at 25° C.; wherein a viscosity ratio of the color ink with respect to the black ink (viscosity of the color ink/viscosity of the black ink) is not less than 1.3. The surface tensions of the color ink and the black ink may be not less than 45 mN/m at 25° C.

According to a second aspect of the present invention, there is provided an ink-jet recording apparatus comprising an ink-jet head; an ink tank which accommodates an ink to be supplied to the ink-jet head; and an ink set of the present invention which is accommodated in the ink tank. The ink set may be in a form of ink cartridge. The ink-jet recording apparatus of the present invention accommodates the ink set of the present invention. Therefore, it is possible to simultaneously avoid the feathering and the bleeding. The ink tank may be an ink container fixedly provided in the ink-jet recording apparatus or an ink cartridge which is replaceable.

In order to solve the problems involved in the conventional technique, we have made diligent studies. As a result, at first, the following fact has been revealed. That is, in order to satisfy the requirement for the feathering, it is advantageous that the ink has a higher surface tension. However, in general, the effect to avoid the feathering is poor unless the surface tension is not less than 40 mN/m. On the contrary, the following fact has been revealed. That is, if the viscosity of the black ink is approximately equivalent to that of the color ink, and the surface tension is not less than 40 mN/m, then the permeation performance of the inks into the recording paper is lowered, and the time of contact between the black ink and the color ink is prolonged on the recording paper. Therefore, the inks are mixed with each other during the period until the inks permeate into the recording paper, resulting in the occurrence of the color bleed.

On the other hand, in order to avoid the color bleed, if the surface tensions are lowered, i.e., if the viscosity of the black ink is approximately equivalent to that of the color ink as in the conventional ink set, and the surface tensions are about 28 to 30 mN/m, then the color bleed is reduced to some extent. However, the following problem arises. That is, the permeation performance into the recording paper is too high. The inks spread non-uniformly along the surface of the recording paper, and the feathering is caused in a deteriorated manner.

The effect to avoid the color bleed according to the present invention may be explained as follows. In the water base color ink set according to the present invention, at first, the surface tensions of the black ink and the color ink at 25° C. are adjusted to have the relatively high values of not less than 40 mN/m, and thus the black ink and the color ink are prevented from the feathering. Further, the viscosity ratio between the black ink and the color ink at 25° C. is adjusted to be not less than 1.3. Accordingly, the effect to avoid the color bleed is obtained. Owing to the effects as described above, it is possible to simultaneously satisfy the requirement for the color bleed in addition to the requirements for the feathering of the black ink and the feathering of the color ink. The effect to avoid the color bleed according to the present invention will be explained in detail below. Two phenomena contribute to the effect to avoid the color bleed according to the present invention.

At first, the black ink and the color ink, which are discharged from the printer and which arrive at the surface of the recording paper, make contact with each other on the recording paper while spreading along the surface of the recording paper respectively. Mixing takes place between the black ink and the color ink at the boundary between the inks at the contact portion. However, the inks are scarcely mixed with each other, because of the presence of the difference in viscosity therebetween. The blurring between the inks at the boundary is suppressed to the minimum. Owing to the fact that the inks are scarcely mixed with each other, the width of the mixing area (hereinafter referred to as "mixing width") is suppressed to the minimum as well.

When the black ink and the color ink are mixed with each other, almost all portions are concealed by the black ink having the relatively dark color. In other words, almost all portions of the mixing width are recognized as the black ink. According to this fact, if the position of occurrence of the mixing width is successfully adjusted so that the portion of the mixing width is included in the area which is to be recorded with the black ink, the mixed portion of the black ink and the color ink is recognized as the black ink. Therefore, the mixed portion is hardly recognized as the color bleed. Thus, it is possible to practically avoid the color bleed.

Secondly, the black ink and the color ink, which are discharged from the printer and which arrive at the surface of the recording paper, make contact with each other on the recording paper while spreading along the surface of the recording paper respectively. Both of the black ink and the color ink, which have made contact with each other, intend to further spread along the recording paper surface. During this process, the black ink is blocked by the spreading force of the color ink, and the black ink cannot spread any more, because the viscosity of the black ink is lower than that of the color ink. On the other hand, the color ink has the strong spreading force as compared with the black ink, because the viscosity of the color ink is relatively high. Accordingly, the color ink slightly spreads toward the black ink in such a manner that the black ink is pushed back thereby. This phenomenon is also a kind of color bleed. As a result of the experiment as described later on, it is effective that the viscosity ratio at 25° C. is adjusted to be not less than 1.3, in order to secure the slight spread. Owing to this effect, the color ink, which has the relatively high viscosity, successfully spreads to the area of the black ink.

When the foregoing two phenomena are utilized in combination, the mixing width of the black ink and the color ink is suppressed to the minimum. Further, owing to the fact that the color ink slightly spreads toward the area of the black ink, the mixing width is included in the area to be subjected to the recording with the black ink. Accordingly, the color bleed is avoided.

Other cases, which are different from those of the present invention, may be explained as follows.

If the viscosity of the black ink is higher than the viscosity of the color ink (viscosity ratio: less than 0.7) unlike the viscosity ratio of the present invention, then the black ink spreads toward the color ink, and it is impossible to conceal the black ink with the color ink. Therefore, it is recognized that the color bleed occurs, and hence the problem arises. The viscosity of the black ink is preferably 1.0 to 8 (cps), and the viscosity of the color ink is preferably 2.0 to 11 (cps).

If the viscosity of the black ink is approximately equivalent to that of the color ink (viscosity ratio: less than 1±0.3), the mixing width is widened. Therefore, the blurring is conspicuous. Further, a part of the mixing width protrudes to the area in which the recording is to be originally performed with the color ink. For these reasons, it is recognized that the color bleed occurs, and hence the problem arises.

Therefore, in order to suppress the movement of the black ink toward the color ink, it is necessary that the viscosity ratio at 25° C. is not less than 1.3.

Finally, if the surface tension of the black ink is not less than 40 mN/m, and the surface tension of the color ink is less than 40 mN/m, then the color ink permeates into the paper simultaneously with the arrival at the recording paper because of the high permeability of the color ink, and the period of time, in which the color ink stays on the recording paper, is extremely short. Therefore, the color ink permeates into the recording paper before the spread of the black ink toward the color ink is suppressed by the difference in viscosity. The black ink, which makes contact with the color ink, spreads toward the color ink in such a manner that the black ink is pulled by the color ink. As a result, the blurring occurs.

Due to the phenomenon as described above, even when the surface tension of the black ink is not less than 40 mN/m, if the surface tension of the color ink is less than 40 mN/m, then the color bleed is easily recognized, and hence the problem arises.

BRIEF DESCRIPTION OF THE DRAWINGS

An embodiment of the invention will be described in detail with reference to the following figures wherein.

DESCRIPTION OF THE PREFERRED EMBODIMENTS

Figure 1:
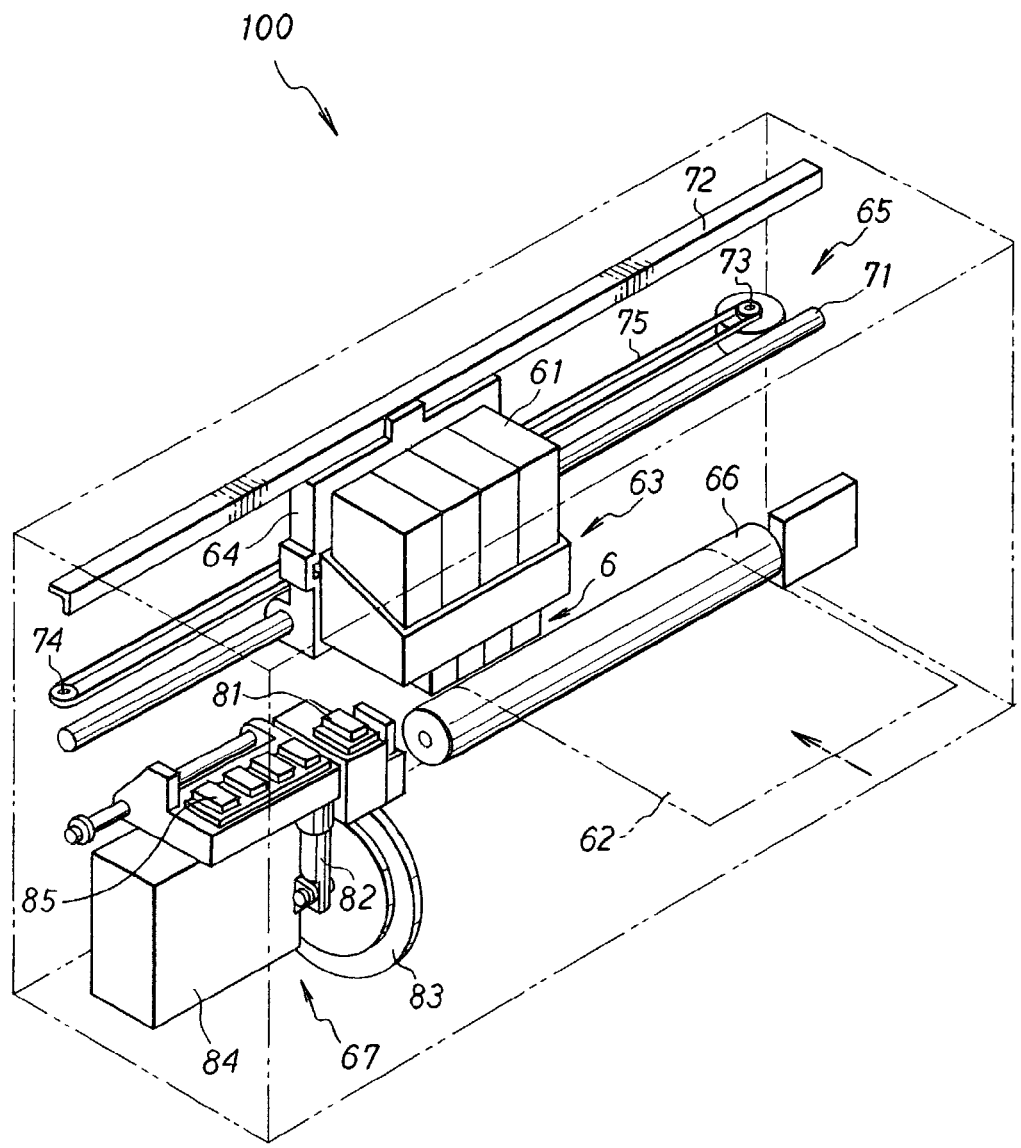
FIG. 1 is a perspective view showing a color ink-jet printer having an ink cartridge which contains ink prepared in examples of the invention.

Examples of the present invention will be explained below.

In general, each of the black ink and the color ink to be used for the present invention is basically composed of the coloring agent, water, the water-soluble organic solvent, and the surface tension-adjusting agent.

Usually, for example, dyes and pigments are used as the coloring agent.

Those usable as the dye include water-soluble dyes represented, for example, by direct dyes, acidic dyes, basic dyes, and reactive dyes. Especially, those, which are preferred for the ink for the ink-jet recording method and which satisfy the required performance such as vividness, water-solubility, stability, and light resistance, include, for example, C.I. Direct Black 17, 19, 32, 51, 71, 108, 146, 154, 168; C.I. Direct Blue 6, 22, 25, 71, 86, 90, 106, 199; C.I. Direct Red 1, 4, 17, 28, 83, 227; C.I. Direct Yellow 12, 24, 26, 86, 98, 132, 142; C.I. Direct Orange 34, 39, 44, 46, 60; C.I. Direct Violet 47, 48; C.I. Direct Brown 109; C.I. Direct Green 59; C.I. Acid Black 2, 7, 24, 26, 31, 52, 63, 112, 118; C.I. Acid Blue 9, 22, 40, 59, 93, 102, 104, 113, 117, 120, 167, 229, 234; C.I. Acid Red 1, 6, 32, 37, 51, 52, 80, 85, 87, 92, 94, 115, 181, 256, 289, 315, 317; C.I. Acid Yellow 11, 17, 23, 25, 29, 42, 61, 71; C.I. Acid Orange 7, 19; C.I. Acid Violet 49; C.I. Basic Black 2; C.I. Basic Blue 1, 3, 5, 7, 9, 24, 25, 26, 28, 29; C.I. Basic Red 1, 2, 9, 12, 13, 14, 37; C.I. Basic Violet 7, 14, 27; and C.I. Food Black 1, 2.

The exemplary dyes described above are especially preferred for the water base ink for ink-jet recording of the present invention. However, the present invention is not limited to these dyes.

In addition to the carbon black, many inorganic pigments and organic pigments may be used as the pigment. The pigment includes, for example, azo pigment such as azo lake, insoluble azo pigment, condensed azo pigment, and chelate azo pigment; polycyclic pigment such as phthalocyanine pigment, perylene and perynone pigments, anthraquinone pigment, quinacridone pigment, dioxazine pigment, thioindigo pigment, isoindolinone pigment, and quinophthalone pigment; dye lake such as basic dye type lake and acidic dye type lake; organic pigment such as nitro pigment, nitroso pigment, and aniline black daylight fluorescent pigment; and inorganic pigment such as titanium oxide, iron oxide-based pigment, and carbon black-based pigment. Other pigments are also usable provided that they are dispersible in the aqueous phase. Further, for example, it is also possible to use those obtained by surface-treating the pigment as described above, for example, with a surfactant or a polymer dispersing agent, such as graft carbon.

The exemplary pigments described above are especially preferred for the water base ink for ink-jet recording of the present invention. However, the present invention is not limited to these pigments.

When the pigment is used as the coloring agent of the present invention, the pigment is subjected to a dispersing treatment together with an appropriate dispersing agent, a solvent, pure water, and optionally other additives in accordance with the conventionally known method.

Polymer dispersing agents and surfactants, which are described, for example, in Japanese Patent Application Laid-open No. 62-101672, may be used as the dispersing agent. The polymer dispersing agent includes, for example, protein such as gelatin and albumin; natural rubber such as gum arabic and gum traganth; glucoside such as saponin; cellulose derivative such as methyl cellulose, carboxy cellulose, and hydroxymethyl cellulose; natural polymer such as ligno-sulfonate and shellac; anionic polymer such as salt of polyacrylic acid, salt of styrene-acrylic acid copolymer, salt of vinylnaphthalene-acrylic acid copolymer, salt of styrene-maleic acid copolymer, salt of vinylnaphthalene-maleic acid copolymer, and sodium salt and phosphoric acid salt of β-naphthalenesulfonic acid-formalin condensate; and non-ionic polymer such as polyvinyl alcohol, polyvinyl pyrrolidone, and polyethylene glycol. The surfactant includes, for example, anionic surfactant such as higher alcohol sulfuric acid ester salt, liquid fatty oil sulfuric acid ester salt, and alkylarylsulfonic acid salt; and nonionic surfactant such as polyoxyethylene alky ether, polyoxyethylene alkyl ester, sorbitan alkyl ester, and polyoxyethylene sorbitan alkyl ester. One of the dispersing agents as described above may be appropriately selected and used singly, or two or more of the dispersing agents may be appropriately selected and used in combination. In general, it is desirable that the dispersing agent is used in an amount of 0.01 to 20% by weight with respect to the total amount of the ink.

On the other hand, any general dispersing machine may be used as the dispersing machine to be used to disperse the pigment. However, the dispersing machine includes, for example, ball mills, roll mills, and sand mills. Especially, it is preferable to use a high speed type sand mill.

The dye and the pigment may be used singly respectively. Alternatively, two or more dyes, two or more pigments, or two or more dyes and pigments may be mixed and used.

The dye and/or the pigment is generally used in a ratio of 0.1 to 20% by weight with respect to the water base ink for ink-jet recording of the present invention. The dye and/or the pigment is desirably used within a range of 0.3 to 15% by weight, and more desirably within a range of 0.5 to 10% by weight.

Usually, as for the water, it is preferable to use water having high purity such as ion exchange water and distilled water, rather than ordinary water. In this case, the content of water is desirably not less than 20% by weight with respect to the total weight of the ink in order that the viscosity is maintained to be low so that application may be made to the ink-jet recording based on a variety of methods, and the change of the viscosity, which would be otherwise caused by the temperature, is suppressed.

Usually, the water-soluble organic solvent is principally used in order to avoid the drying-up and the occurrence of deposition from the ink at the tip of the ink-jet head. Therefore, it is desirable to select the solvent which has low volatility and which has high solubility for the dye. The water-soluble organic solvent as described above may include, for example, polyvalent alcohols such as ethylene glycol, diethylene glycol, triethylene glycol, polyethylene glycol, propylene glycol, dipropylene glycol, tripropylene glycol, polypropylene glycol, 1,3-butanediol, 1,5-pentanediol, 1,6-hexanediol, glycerol, 1,2,6-hexanetriol, 1,2,4-butanetriol, and 1,2,3-butanetriol, 1,2,3-pentanetriol; nitrogen-containing heterocyclic compounds such as N-methyl-2-pyrrolidone, N-hydroxyethyl-2-pyrrolidone, 2-pyrrolidone, 1,3-dimethylimidazolidinone, and ε-caprolactam; amides such as formamide, N-methylformamide, and N,N-dimethylformamide; amines such as monoethanolamine, diethanolamine, triethanolamine, monoethylamine, diethylamine, and triethylamine; and sulfur-containing compounds such as dimethylsulfoxide, sulfolane, and thiodiethanol. The water-soluble organic solvent may be used singly. Alternatively, two or more of the water-soluble organic solvents may be used in a mixed manner. Those of the polyvalent alcohol alkyl ethers as described later on, which have the vapor pressure at 20° C. of less than 0.01 mmHg, may be also used as the water-soluble organic solvent.

The content of the water-soluble organic solvent in the ink is 5 to 70% by weight, preferably 7 to 50% by weight, and more preferably 10 to 40% by weight with respect to the total amount of the ink. If the content is less than 5% by weight, the moistening action is insufficient to cause, for example, problems of deposition and drying-up. If the content exceeds 40% by weight, the viscosity of the ink is unnecessarily increased. For example, the following problems arise. That is, the ink cannot be discharged, and the ink is dried extremely slowly on the recording paper.

Usually, the polyvalent alcohol alkyl ether or the surfactant is used as the surface tension-adjusting agent.

The polyvalent alcohol alkyl ether includes, for example, diethylene glycol monomethyl ether, diethylene glycol monobutyl ether, diethylene glycol monoisobutyl ether, diethylene glycol dimethyl ether, diethylene glycol dibutyl ether, dipropylene glycol monomethyl ether, dipropylene glycol monopropyl ether, dipropylene glycol monoisopropyl ether, dipropylene glycol monobutyl ether, dipropylene glycol dimethyl ether, dipropylene glycol dipropyl ether, dipropylene glycol dibutyl ether, triethylene glycol monomethyl ether, triethylene glycol monobutyl ether, tripropylene glycol monomethyl ether, tripropylene glycol monobutyl ether, triethylene glycol dimethyl ether, triethylene glycol dibutyl ether, tripropylene glycol dimethyl ether, and tripropylene glycol dibutyl ether.

Those of the polyvalent alcohol alkyl ethers described above, which have the vapor pressure at 20° C. of less than 0.01 mmHg, may be also used as the water-soluble organic solvent.

The content of the polyvalent alcohol alkyl ether in the ink is preferably 0.1 to 40% by weight with respect to the total amount of the ink. If the content is less than 0.1% by weight, then the ink permeates into the recording paper at a slow speed, and any problem arises concerning the drying time and the color bleed. On the other hand, if the content exceeds 40% by weight, the ink intensely permeates into the recording paper. As a result, the ink arrives at the back of the recording paper, and any problem arises concerning the feathering as well. Those usable as the surfactant include, for example, anionic surfactants such as fatty acid salts and alkyl sulfuric acid ester salts; nonionic surfactants such as polyoxyethylene alkyl ether and polyoxyethylene phenyl ether; acetylene glycol-based nonionic surfactants such as Olfine E1004, E1010 (both trade names, produced by Nissin Chemical Industry Co., Ltd.), and Surfynol 61, 82, 104, 440, 465, 485 (all trade names, produced by Air Products and Chemicals); cationic surfactants, and amphoteric surfactants. It is preferable that the content of the surfactant to serve as the permeating agent in the ink is within a range of 0.1 to 5% by weight.

Further, in order to control the drying performance and the permeation of the ink into the recording paper, it is also possible to use monovalent alcohol such as ethanol and isopropyl alcohol.

The ink composition for ink-jet recording of the present invention is basically constructed as described above. Additionally, for example, it is possible to add other conventionally known dispersing agents, viscosity-adjusting agents, pH-adjusting agents, dye-dissolving agents, and antiseptic/fungicidal agents, if necessary.

When the ink, which is used for the ink-jet recording method of the type to electrically charge the recording liquid, is formulated, a specific resistance-adjusting agent including, for example, inorganic salts such as lithium chloride, ammonium chloride, and sodium chloride is added.

When the ink of the present invention is applied to the ink-jet recording method of the type in which the ink is discharged in accordance with the action of the thermal energy, values of thermal physical properties (for example, those of the specific heat, the coefficient of thermal expansion, and the coefficient of thermal conductivity) are adjusted in some cases.

In the water base color ink set for ink-jet recording of the present invention obtained as described above, the problems involved in the conventional technique are sufficiently solved. The feathering and the color bleed are reduced in the ink-jet recording method. It is possible to provide the vivid color recording.

Ink compositions according to the present invention will be described as Examples below. Numerical values are expressed by % by weight. In respective Examples and Comparative Examples described below, the numerical values of the ink compositions are expressed by % by weight. The surface tension, the viscosity, and the viscosity ratio are those obtained at 25° C.

EXAMPLE 1

The ink compositions, the surface tensions, the viscosities, and the viscosity ratios of inks of Example 1 are shown in Table 1.

TABLE 1

| Example 1 | Black | Yellow |
| --- | --- | --- |
| Pure water | 51.7 | 60.3 |
| CAB-O-JET 300 black (carbon black pigment, produced by Cabot) | 33.3 | — |
| IJY214H (C.I. Direct Yellow 86, produced by Daiwa Kasei Co., Ltd.) | — | 2.7 |
| Triethylene glycol monobutyl ether | 3 | 3 |
| Glycerol | 12 | 24 |
| Viscosity (cps) | 2.0 | 3.0 |

TABLE 1-continued

| Example 1 | Black | Yellow |
|---|---|---|
| Viscosity ratio | | 1.5 |
| Surface tension (mN/m) | 45 | 46 |

The inks were prepared, in which the surface tension at 25° C. was not less than 40 mN/m, and the viscosity ratio between the black ink and the color ink (viscosity of the color ink/viscosity of the black ink) was not less than 1.3.

EXAMPLE 2

The ink compositions, the surface tensions, the viscosities, and the viscosity ratios of inks of Example 2 are shown in Table 2.

TABLE 2

| Example 2 | Black | Yellow |
|---|---|---|
| Pure water | 46.7 | 60.3 |
| CAB-O-JET 300 black (carbon black pigment, produced by Cabot) | 33.3 | — |
| IJY214H (C.I. Direct Yellow 86, produced by Daiwa Kasei Co., Ltd.) | — | 2.7 |
| Triethylene glycol monobutyl ether | 3 | 3 |
| Glycerol | 17 | 34 |
| Viscosity (cps) | 2.3 | 3.0 |
| Viscosity ratio | | 1.3 |
| Surface tension (mN/m) | 45 | 46 |

The inks were prepared, in which the composition of the yellow ink of Example 1 was not changed, the viscosity of the black ink was increased by adjusting the amount of glycerol in the black ink, and the viscosity ratio was not less than 1.3.

EXAMPLES 3 and 4

The ink compositions, the surface tensions, the viscosities, and the viscosity ratios of inks of Examples 3 and 4 are shown in Tables 3 and 4.

TABLE 3

| Example 3 | Black | Yellow |
|---|---|---|
| Pure water | 79.3 | 62.3 |
| MA-100 (carbon black pigment, produced by Mitsubishi Chemical Corporation) | 5 | — |
| Dysperbyk (anionic dispersing agent, produced by BYK Chemie) | 0.7 | — |
| IJY214H (C.I. Direct Yellow 86, produced by Daiwa Kasei Co., Ltd.) | — | 2.7 |
| Triethylene glycol dimethyl ether | 5 | 5 |
| Glycerol | 10 | 30 |
| Viscosity (cps) | 1.9 | 3.0 |
| Viscosity ratio | | 1.6 |
| Surface tension (mN/m) | 55 | 54 |

TABLE 4

| Example 4 | Black | Yellow |
|---|---|---|
| Pure water | 76.3 | 62.3 |
| MA-100 (carbon black pigment, produced by Mitsubishi Chemical Corporation) | 5 | — |
| Dysperbyk (anionic dispersing agent, produced by BYK Chemie) | 0.7 | — |

TABLE 4-continued

| Example 4 | Black | Yellow |
|---|---|---|
| IJY214H (C.I. Direct Yellow 86, produced by Daiwa Kasei Co., Ltd.) | — | 2.7 |
| Triethylene glycol dimethyl ether | 5 | 5 |
| Glycerol | 13 | 30 |
| Viscosity (cps) | 2.3 | 3.0 |
| Viscosity ratio | | 1.3 |
| Surface tension (mN/m) | 55 | 54 |

At first, a pigment mill base to be used for the black ink was prepared in accordance with the following procedure.

Seventy-three (73) % by weight of pure water is added to 10% by weight of glycerol and 2% by weight of the dispersing agent, followed by performing agitation. Fifteen (15) % by weight of the carbon black is added thereto so that the total weight of the mill base is 100% by weight, followed by being dispersed with a bead mill for further 2 hours. After completing the dispersing treatment with the bead mill, deaeration and filtration are performed to prepare the mill base. The mill base is used as the material for the black ink. The amounts of glycerol and pure water are regulated in order to obtain the designed ink composition.

In Examples 3 and 4, the inks were prepared, in which the species of the pigment was changed for the black ink as compared with Examples 1 and 2, the species of the permeating agent was changed for the black ink and the yellow ink, and the viscosity ratio was not less than 1.3. The composition of the yellow ink in Example 3 was the same as that in Example 4.

EXAMPLES 5 and 6

The ink compositions, the surface tensions, the viscosities, and the viscosity ratios of inks of Examples 5 and 6 are shown in Tables 5 and 6.

TABLE 5

| Example 5 | Black | Yellow |
|---|---|---|
| Pure water | 79.8 | 61.8 |
| MA-100 (carbon black pigment, produced by Mitsubishi Chemical Corporation) | 5 | — |
| Dysperbyk (anionic dispersing agent, produced by BYK Chemie) | 0.7 | — |
| IJY205H (C.I. A. Y. 23, produced by Daiwa Kasei Co., Ltd.) | — | 2.7 |
| Triethylene glycol monobutyl ether | 0.5 | 0.5 |
| Glycerol | 14 | 35 |
| Viscosity (cps) | 2.0 | 3.0 |
| Viscosity ratio | | 1.5 |
| Surface tension (mN/m) | 59 | 58 |

TABLE 6

| Example 6 | Black | Yellow |
|---|---|---|
| Pure water | 75.8 | 61.8 |
| MA-100 (carbon black pigment, produced by Mitsubishi Chemical Corporation) | 5 | — |
| Dysperbyk (anionic dispersing agent, produced by BYK Chemie) | 0.7 | — |
| IJY205H (C.I. A. Y. 23, produced by Daiwa Kasei Co., Ltd.) | — | 2.7 |
| Triethylene glycol monobutyl ether | 0.5 | 0.5 |
| Glycerol | 18 | 35 |

TABLE 6-continued

| Example 6 | Black | Yellow |
|---|---|---|
| Viscosity (cps) | 2.3 | 3.0 |
| Viscosity ratio | 1.3 | |
| Surface tension (mN/m) | 59 | 58 |

A pigment mill base was prepared in accordance with the same procedure as that used in Examples 3 and 4, and the mill base was used as the material for the black ink. Further, the inks were prepared, in which the surface tension was changed to about 60 mN/m by adjusting the amount of triethylene glycol-n-butyl ether in the yellow ink, and the viscosity ratio was not less than 1.3. The composition of the yellow ink in Example 5 was the same as that in Example 6.

EXAMPLES 7 and 8

The ink compositions, the surface tensions, the viscosities, and the viscosity ratios of inks of Examples 7 and 8 are shown in Tables 7 and 8.

TABLE 7

| Example 7 | Black | Yellow |
|---|---|---|
| Pure water | 57.3 | 26.3 |
| Printex 150T (carbon black pigment, produced by Degussa) | 5 | — |
| Dysperbyk (anionic dispersing agent, produced by BYK Chemie) | 0.7 | — |
| IJY306H (C.I. Direct Yellow 132, produced by Daiwa Kasei Co., Ltd.) | — | 2.7 |
| Triethylene glycol monobutyl ether | 3 | 3 |
| Glycerol | 34 | 68 |
| Viscosity (cps) | 6.0 | 10.2 |
| Viscosity ratio | 1.7 | |
| Surface tension (mN/m) | 48 | 47 |

TABLE 8

| Example 8 | Black | Yellow |
|---|---|---|
| Pure water | 47.3 | 26.3 |
| Printex 150T (carbon black pigment, produced by Degussa) | 5 | — |
| Dysperbyk (anionic dispersing agent, produced by BYK Chemie) | 0.7 | — |
| IJY306H (C.I. Direct Yellow 132, produced by Daiwa Kasei Co., Ltd.) | — | 2.7 |
| Triethylene glycol monobutyl ether | 3 | 3 |
| Glycerol | 44 | 68 |
| Viscosity (cps) | 7.4 | 10.2 |
| Viscosity ratio | 1.4 | |
| Surface tension (mN/m) | 48 | 47 |

A pigment mill base was prepared in accordance with the same procedure as that used in Examples 3 and 4, and the mill base was used as the material for the black ink. Further, the inks were prepared, in which the viscosity was changed to be within a relatively high viscosity region, i.e., 6 to 10 cps by adjusting the amount of glycerol for the black ink and the yellow ink, and the viscosity ratio was not less than 1.3. The composition of the yellow ink in Example 7 was the same as that in Example 8.

EXAMPLES 9 and 10

The ink compositions, the surface tensions, the viscosities, and the viscosity ratios of inks of Examples 9 and 10 are shown in Tables 9 and 10.

TABLE 9

| Example 9 | Black | Yellow |
|---|---|---|
| Pure water | 78.8 | 61 |
| Monarch 880 (carbon black pigment, produced by Cabot) | 5 | — |
| Dysperbyk (anionic dispersing agent, produced by BYK Chemie) | 0.7 | — |
| IJY306H (C.I. Direct Yellow 132, produced by Daiwa Kasei Co., Ltd.) | — | 2.7 |
| Olfine E1010 (surfactant, produced by Nissin Chemical Industry Co., Ltd.) | 0.5 | 0.3 |
| Glycerol | 15 | 36 |
| Viscosity (cps) | 2.1 | 3.0 |
| Viscosity ratio | 1.4 | |
| Surface tension (mN/m) | 46 | 48 |

TABLE 10

| Example 10 | Black | Yellow |
|---|---|---|
| Pure water | 75.8 | 61 |
| Monarch 880 (carbon black pigment, produced by Cabot) | 5 | — |
| Dysperbyk (anionic dispersing agent, produced by BYK Chemie) | 0.7 | — |
| IJY306H (C.I. Direct Yellow 132, produced by Daiwa Kasei Co., Ltd.) | — | 2.7 |
| Olfine E1010 (surfactant, produced by Nissin Chemical Industry Co., Ltd.) | 0.5 | 0.3 |
| Glycerol | 18 | 36 |
| Viscosity (cps) | 2.3 | 3.0 |
| Viscosity ratio | 1.3 | |
| Surface tension (mN/m) | 46 | 48 |

A pigment mill base was prepared in accordance with the same procedure as that used in Examples 3 and 4, and the mill base was used as the material for the black ink. Further, the inks were prepared, in which the surface tension was adjusted to 45 mN/m with the surfactant without using any permeating agent for the black ink and the yellow ink, and the viscosity ratio was not less than 1.3. The composition of the yellow ink in Example 9 was the same as that in Example 10.

EXAMPLES 11 and 12

The ink compositions, the surface tensions, the viscosities, and the viscosity ratios of inks of Examples 11 and 12 are shown in Tables 11 and 12.

TABLE 11

| Example 11 | Black | Yellow |
|---|---|---|
| Pure water | 51.7 | 67.3 |
| CAB-O-JET 300 black (carbon black pigment, produced by Cabot) | 33.3 | — |
| IJY214H (C.I. Direct Yellow 86, produced by Daiwa Kasei Co., Ltd.) | — | 2.7 |
| Triethylene glycol monobutyl ether | 3 | — |
| Triethylene glycol dimethyl ether | — | 30 |
| Glycerol | 12 | — |
| Viscosity (cps) | 2.0 | 3.0 |
| Viscosity ratio | 1.5 | |
| Surface tension (mN/m) | 45 | 46 |

TABLE 12

| Example 12 | Black | Yellow |
| --- | --- | --- |
| Pure water | 44.7 | 67.3 |
| CAB-O-JET 300 black (carbon black pigment, produced by Cabot) | 33.3 | — |
| IJY214H (C.I. Direct Yellow 86, produced by Daiwa Kasei Co., Ltd.) | — | 2.7 |
| Triethylene glycol monobutyl ether | 3 | — |
| Triethylene glycol dimethyl ether | — | 30 |
| Glycerol | 19 | — |
| Viscosity (cps) | 2.3 | 3.0 |
| Viscosity ratio | | 1.3 |
| Surface tension (mN/m) | 45 | 46 |

The inks were prepared, in which the same black ink as that used in Examples 1 and 2 was used, the species of the permeating agent used in the yellow ink was changed, and the viscosity ratio was not less than 1.3. The composition of the yellow ink in Example 11 was the same as that in Example 12.

EXAMPLES 13 and 14

The ink compositions, the surface tensions, the viscosities, and the viscosity ratios of inks of Examples 13 and 14 are shown in Tables 13 and 14.

TABLE 13

| Example 13 | Black | Magenta |
| --- | --- | --- |
| Pure water | 51.7 | 57.5 |
| CAB-O-JET 300 black (carbon black pigment, produced by Cabot) | 33.3 | — |
| C.I. Direct Red 227 | — | 2.5 |
| Triethylene glycol monobutyl ether | 3 | 3 |
| Glycerol | 12 | 37 |
| Viscosity (cps) | 2.0 | 3.0 |
| Viscosity ratio | | 1.5 |
| Surface tension (mN/m) | 45 | 46 |

TABLE 14

| Example 14 | Black | Magenta |
| --- | --- | --- |
| Pure water | 46.7 | 57.5 |
| CAB-O-JET 300 black (carbon black pigment, produced by Cabot) | 33.3 | — |
| C.I. Direct Red 227 | — | 2.5 |
| Triethylene glycol monobutyl ether | 3 | 3 |
| Glycerol | 17 | 37 |
| Viscosity (cps) | 2.3 | 3.0 |
| Viscosity ratio | | 1.3 |
| Surface tension (mN/m) | 45 | 46 |

The inks were prepared, in which the same black ink as that used in Examples 1 and 2 was used, the magenta ink was the color ink, and the viscosity ratio was not less than 1.3. The composition of the magenta ink in Example 13 was the same as that in Example 14.

EXAMPLES 15 and 16

The ink compositions, the surface tensions, the viscosities, and the viscosity ratios of inks of Examples 15 and 16 are shown in Tables 15 and 16.

TABLE 15

| Example 15 | Black | Cyan |
| --- | --- | --- |
| Pure water | 51.7 | 58.5 |
| CAB-O-JET 300 black (carbon black pigment, produced by Cabot) | 33.3 | — |
| C.I. Direct Blue 199 | — | 2.5 |
| Triethylene glycol monobutyl ether | 3 | 3 |
| Glycerol | 12 | 36 |
| Viscosity (cps) | 2.0 | 3.0 |
| Viscosity ratio | | 1.5 |
| Surface tension (mN/m) | 45 | 46 |

TABLE 16

| Example 16 | Black | Cyan |
| --- | --- | --- |
| Pure water | 46.7 | 58.5 |
| CAB-O-JET 300 black (carbon black pigment, produced by Cabot) | 33.3 | — |
| C.I. Direct Blue 199 | — | 2.5 |
| Triethylene glycol monobutyl ether | 3 | 3 |
| Glycerol | 17 | 36 |
| Viscosity (cps) | 2.3 | 3.0 |
| Viscosity ratio | | 1.3 |
| Surface tension (mN/m) | 45 | 46 |

The inks were prepared, in which the same black ink as that used in Examples 1 and 2 was used, the cyan ink was the color ink, and the viscosity ratio was not less than 1.3. The composition of the cyan ink in Example 15 was the same as that in Example 16.

COMPARATIVE EXAMPLES 1, 2, and 3

The ink compositions, the surface tensions, the viscosities, and the viscosity ratios of inks of Comparative Examples 1, 2, and 3 are shown in Tables 17, 18, and 19.

TABLE 17

| Comparative Example 1 | Black | Yellow |
| --- | --- | --- |
| Pure water | 38.7 | 60.3 |
| CAB-O-JET 300 black (carbon black pigment, produced by Cabot) | 33.3 | — |
| IJY214H (C.I. Direct Yellow 86, produced by Daiwa Kasei Co., Ltd.) | — | 2.7 |
| Triethylene glycol monobutyl ether | 3 | 3 |
| Glycerol | 25 | 34 |
| Viscosity (cps) | 3.1 | 3.0 |
| Viscosity ratio | | 1.0 |
| Surface tension (mN/m) | 45 | 46 |

TABLE 18

| Comparative Example 2 | Black | Yellow |
| --- | --- | --- |
| Pure water | 43.7 | 60.3 |
| CAB-O-JET 300 black (carbon black pigment, produced by Cabot) | 33.3 | — |
| IJY214H (C.I. Direct Yellow 86, produced by Daiwa Kasei Co., Ltd.) | — | 2.7 |
| Triethylene glycol monobutyl ether | 3 | 3 |
| Glycerol | 20 | 34 |
| Viscosity (cps) | 2.7 | 3.0 |
| Viscosity ratio | | 1.1 |
| Surface tension (mN/m) | 45 | 46 |

TABLE 19

| Comparative Example 3 | Black | Yellow |
|---|---|---|
| Pure water | 38.7 | 70.3 |
| CAB-O-JET 300 black (carbon black pigment, produced by Cabot) | 33.3 | — |
| IJY214H (C.I. Direct Yellow 86, produced by Daiwa Kasei Co., Ltd.) | — | 2.7 |
| Triethylene glycol monobutyl ether | 3 | 3 |
| Glycerol | 25 | 24 |
| Viscosity (cps) | 3.1 | 2.0 |
| Viscosity ratio | 0.6 | |
| Surface tension (mN/m) | 45 | 46 |

The inks were prepared, in which the composition of the yellow ink in Examples 1 and 2 was not changed, the viscosity of the black ink was increased by adjusting the amount of glycerol in the black ink, and the viscosity ratio was less than 1.3.

COMPARATIVE EXAMPLES 4 and 5

The ink compositions, the surface tensions, the viscosities, and the viscosity ratios of inks of Comparative Examples 4 and 5 are shown in Tables 20 and 21.

TABLE 20

| Comparative Example 4 | Black | Yellow |
|---|---|---|
| Pure water | 51.7 | 62.3 |
| CAB-O-JET 300 black (carbon black pigment, produced by Cabot) | 33.3 | — |
| IJY214H (C.I. Direct Yellow 86, produced by Daiwa Kasei Co., Ltd.) | — | 2.7 |
| Triethylene glycol monobutyl ether | 15 | 15 |
| Glycerol | — | 20 |
| Viscosity (cps) | 2.0 | 3.2 |
| Viscosity ratio | 1.6 | |
| Surface tension (mN/m) | 35 | 35 |

TABLE 21

| Comparative Example 5 | Black | Yellow |
|---|---|---|
| Pure water | 39.7 | 62.3 |
| CAB-O-JET 300 black (carbon black pigment, produced by Cabot) | 33.3 | — |
| IJY214H (C.I. Direct Yellow 86, produced by Daiwa Kasei Co., Ltd.) | — | 2.7 |
| Triethylene glycol monobutyl ether | 15 | 15 |
| Glycerol | 12 | 20 |
| Viscosity (cps) | 3.0 | 3.2 |
| Viscosity ratio | 1.1 | |
| Surface tension (mN/m) | 36 | 35 |

The inks were prepared, in which the surface tension was 35 mN/m by adjusting the amount of triethylene glycol monobutyl ether with respect to the compositions of the black ink and the yellow ink in Examples 1 and 2, and the viscosity ratio was not less than 1.3 (Comparative Example 4) or less than 1.3 (Comparative Example 5) by adjusting the amount of glycerol in the black ink.

COMPARATIVE EXAMPLE 6

The ink compositions, the surface tensions, the viscosities, and the viscosity ratios of inks of Comparative Example 6 are shown in Table 22.

TABLE 22

| Comparative Example 6 | Black | Yellow |
|---|---|---|
| Pure water | 46.7 | 62.3 |
| CAB-O-JET 300 black (carbon black pigment, produced by Cabot) | 33.3 | — |
| IJY214H (C.I. Direct Yellow 86, produced by Daiwa Kasei Co., Ltd.) | — | 2.7 |
| Triethylene glycol monobutyl ether | 3 | 15 |
| Glycerol | 17 | 20 |
| Viscosity (cps) | 2.3 | 3.2 |
| Viscosity ratio | 1.4 | |
| Surface tension (mN/m) | 45 | 35 |

The inks were prepared, in which the same black ink as that used in Example 1 was used, only the surface tension of the yellow ink was 35 mN/m by adjusting the amount of triethylene glycol monobutyl ether, and the viscosity ratio was not less than 1.3.

COMPARATIVE EXAMPLES 7 and 8

The ink compositions, the surface tensions, the viscosities, and the viscosity ratios of inks of Comparative Examples 7 and 8 are shown in Tables 23 and 24.

TABLE 23

| Comparative Example 7 | Black | Yellow |
|---|---|---|
| Pure water | 68.3 | 62.3 |
| MA-100 (carbon black pigment, produced by Mitsubishi Chemical Corporation) | 5 | — |
| Dysperbyk (anionic dispersing agent, produced by BYK Chemie) | 0.7 | — |
| IJY214H (C.I. Direct Yellow 86, produced by Daiwa Kasei Co., Ltd.) | — | 2.7 |
| Triethylene glycol dimethyl ether | 5 | 5 |
| Glycerol | 21 | 30 |
| Viscosity (cps) | 3.0 | 3.0 |
| Viscosity ratio | 1.0 | |
| Surface tension (mN/m) | 55 | 54 |

TABLE 24

| Comparative Example 8 | Black | Yellow |
|---|---|---|
| Pure water | 71.3 | 62.3 |
| MA-100 (carbon black pigment, produced by Mitsubishi Chemical Corporation) | 5 | — |
| Dysperbyk (anionic dispersing agent, produced by BYK Chemie) | 0.7 | — |
| IJY214H (C.I. Direct Yellow 86, produced by Daiwa Kasei Co., Ltd.) | — | 2.7 |
| Triethylene glycol dimethyl ether | 5 | 5 |
| Glycerol | 18 | 30 |
| Viscosity (cps) | 2.7 | 3.0 |
| Viscosity ratio | 1.1 | |
| Surface tension (mN/m) | 55 | 54 |

The inks were prepared, in which the composition of the yellow ink in Examples 3 and 4 was not changed, the viscosity of the black ink was increased by adjusting the amount of glycerol in the black ink, and the viscosity ratio was less than 1.3.

COMPARATIVE EXAMPLES 9 and 10

The ink compositions, the surface tensions, the viscosities, and the viscosity ratios of inks of Comparative Examples 9 and 10 are shown in Tables 25 and 26.

TABLE 25

| Comparative Example 9 | Black | Yellow |
|---|---|---|
| Pure water | 67.8 | 61.8 |
| MA-100 (carbon black pigment, produced by Mitsubishi Chemical Corporation) | 5 | — |
| Dysperbyk (anionic dispersing agent, produced by BYK Chemie) | 0.7 | — |
| IJY205H (C.I. A. Y. 23, produced by Daiwa Kasei Co., Ltd.) | — | 2.7 |
| Triethylene glycol monobutyl ether | 0.5 | 0.5 |
| Glycerol | 26 | 35 |
| Viscosity (cps) | 3.0 | 3.0 |
| Viscosity ratio | | 1.0 |
| Surface tension (mN/m) | 59 | 58 |

TABLE 26

| Comparative Example 10 | Black | Yellow |
|---|---|---|
| Pure water | 69.8 | 61.8 |
| MA-100 (carbon black pigment, produced by Mitsubishi Chemical Corporation) | 5 | — |
| Dysperbyk (anionic dispersing agent, produced by BYK Chemie) | 0.7 | — |
| IJY205H (C.I. A. Y. 23, produced by Daiwa Kasei Co., Ltd.) | — | 2.7 |
| Triethylene glycol monobutyl ether | 0.5 | 0.5 |
| Glycerol | 24 | 35 |
| Viscosity (cps) | 2.7 | 3.0 |
| Viscosity ratio | | 1.1 |
| Surface tension (mN/m) | 59 | 58 |

The inks were prepared, in which the composition of the yellow ink in Examples 5 and 6 was not changed, the viscosity of the black ink was increased by adjusting the amount of glycerol in the black ink, and the viscosity ratio was less than 1.3.

COMPARATIVE EXAMPLES 11 and 12

The ink compositions, the surface tensions, the viscosities, and the viscosity ratios of inks of Comparative Examples 11 and 12 are shown in Tables 27 and 28.

TABLE 27

| Comparative Example 11 | Black | Yellow |
|---|---|---|
| Pure water | 47.3 | 32.3 |
| Printex 150T (carbon black pigment, produced by Degussa) | 5 | — |
| Dysperbyk (anionic dispersing agent, produced by BYK Chemie) | 0.7 | — |
| IJY306H (C.I. Direct Yellow 132, produced by Daiwa Kasei Co., Ltd.) | — | 2.7 |
| Triethylene glycol monobutyl ether | 3 | 3 |
| Glycerol | 44 | 62 |
| Viscosity (cps) | 7.4 | 7.4 |
| Viscosity ratio | | 1.0 |
| Surface tension (mN/m) | 48 | 47 |

TABLE 28

| Comparative Example 12 | Black | Yellow |
|---|---|---|
| Pure water | 47.3 | 29.3 |
| Printex 150T (carbon black pigment, produced by Degussa) | 5 | — |
| Dysperbyk (anionic dispersing agent, produced by BYK Chemie) | 0.7 | — |

TABLE 28-continued

| Comparative Example 12 | Black | Yellow |
|---|---|---|
| IJY306H (C.I. Direct Yellow 132, produced by Daiwa Kasei Co., Ltd.) | — | 2.7 |
| Triethylene glycol monobutyl ether | 3 | 3 |
| Glycerol | 44 | 65 |
| Viscosity (cps) | 7.4 | 8.2 |
| Viscosity ratio | | 1.1 |
| Surface tension (mN/m) | 48 | 46 |

The inks were prepared, in which the composition of the black ink in Example 8 was not changed, the viscosity of the yellow ink was lowered by adjusting the amount of glycerol in the yellow ink while maintaining the relatively high viscosity region of the viscosity of 6 to 10 cps, and the viscosity ratio was less than 1.3.

COMPARATIVE EXAMPLES 13 and 14

The ink compositions, the surface tensions, the viscosities, and the viscosity ratios of inks of Comparative Examples 13 and 14 are shown in Tables 29 and 30.

TABLE 29

| Comparative Example 13 | Black | Yellow |
|---|---|---|
| Pure water | 68.8 | 61 |
| Monarch 880 (carbon black pigment, produced by Cabot) | 5 | — |
| Dysperbyk (anionic dispersing agent, produced by BYK Chemie) | 0.7 | — |
| IJY306H (C.I. Direct Yellow 132, produced by Daiwa Kasei Co., Ltd.) | — | 2.7 |
| Olfine E1010 (surfactant, produced by Nissin Chemical Industry Co., Ltd.) | 0.5 | 0.3 |
| Glycerol | 25 | 36 |
| Viscosity (cps) | 2.9 | 3.0 |
| Viscosity ratio | | 1.0 |
| Surface tension (mN/m) | 46 | 48 |

TABLE 30

| Comparative Example 14 | Black | Yellow |
|---|---|---|
| Pure water | 70.8 | 61 |
| Monarch 880 (carbon black pigment, produced by Cabot) | 5 | — |
| Dysperbyk (anionic dispersing agent, produced by BYK Chemie) | 0.7 | — |
| IJY306H (C.I. Direct Yellow 132, produced by Daiwa Kasei Co., Ltd.) | — | 2.7 |
| Olfine E1010 (surfactant, produced by Nissin Chemical Industry Co., Ltd.) | 0.5 | 0.3 |
| Glycerol | 23 | 36 |
| Viscosity (cps) | 2.7 | 3.0 |
| Viscosity ratio | | 1.1 |
| Surface tension (mN/m) | 47 | 48 |

The inks were prepared, in which the composition of the yellow ink in Examples 9 and 10 was not changed, the viscosity of the black ink was increased by adjusting the amount of glycerol in the black ink, and the viscosity ratio was less than 1.3.

COMPARATIVE EXAMPLES 15 and 16

The ink compositions, the surface tensions, the viscosities, and the viscosity ratios of inks of Comparative Examples 15 and 16 are shown in Tables 31 and 32.

TABLE 31

| Comparative Example 15 | Black | Yellow |
| --- | --- | --- |
| Pure water | 63.7 | 67.3 |
| CAB-O-JET 300 black (carbon black pigment, produced by Cabot) | 33.3 | — |
| IJY214H (C.I. Direct Yellow 86, produced by Daiwa Kasei Co., Ltd.) | — | 2.7 |
| Triethylene glycol monobutyl ether | 3 | — |
| Triethylene glycol dimethyl ether | — | 30 |
| Glycerol | 25 | — |
| Viscosity (cps) | 3.1 | 3.0 |
| Viscosity ratio | 1.0 | |
| Surface tension (mN/m) | 45 | 46 |

TABLE 32

| Comparative Example 16 | Black | Yellow |
| --- | --- | --- |
| Pure water | 38.7 | 67.3 |
| CAB-O-JET 300 black (carbon black pigment, produced by Cabot) | 33.3 | — |
| IJY214H (C.I. Direct Yellow 86, produced by Daiwa Kasei Co., Ltd.) | — | 2.7 |
| Triethylene glycol monobutyl ether | 3 | — |
| Triethylene glycol dimethyl ether | — | 30 |
| Glycerol | 25 | — |
| Viscosity (cps) | 2.7 | 3.0 |
| Viscosity ratio | 1.1 | |
| Surface tension (mN/m) | 45 | 46 |

The inks were prepared, in which the composition of the yellow ink in Examples 11 and 12 was not changed, the viscosity of the black ink was increased by adjusting the amount of glycerol in the black ink, and the viscosity ratio was less than 1.3 (the compositions of the black inks were the same as those used in Comparative Examples 1 and 2).

COMPARATIVE EXAMPLES 17 and 18

The ink compositions, the surface tensions, the viscosities, and the viscosity ratios of inks of Comparative Examples 17 and 18 are shown in Tables 33 and 34.

TABLE 33

| Comparative Example 17 | Black | Magenta |
| --- | --- | --- |
| Pure water | 43.7 | 57.5 |
| CAB-O-JET 300 black (carbon black pigment, produced by Cabot) | 33.3 | — |
| C.I. Direct Red 227 | — | 2.5 |
| Triethylene glycol monobutyl ether | 3 | 3 |
| Glycerol | 20 | 37 |
| Viscosity (cps) | 2.7 | 3.0 |
| Viscosity ratio | 1.1 | |
| Surface tension (mN/m) | 45 | 46 |

TABLE 34

| Comparative Example 18 | Black | Magenta |
| --- | --- | --- |
| Pure water | 38.7 | 57.5 |
| CAB-O-JET 300 black (carbon black pigment, produced by Cabot) | 33.3 | — |
| C.I. Direct Red 227 | — | 2.5 |
| Triethylene glycol monobutyl ether | 3 | 3 |
| Glycerol | 25 | 37 |
| Viscosity (cps) | 3.1 | 3.0 |

TABLE 34-continued

| Comparative Example 18 | Black | Magenta |
| --- | --- | --- |
| Viscosity ratio | 1.0 | |
| Surface tension (mN/m) | 45 | 46 |

The inks were prepared, in which the composition of the magenta ink in Examples 13 and 14 was not changed, the viscosity of the black ink was increased by adjusting the amount of glycerol in the black ink, and the viscosity ratio was less than 1.3 (the compositions of the black inks were the same as those used in Comparative Examples 1 and 2).

COMPARATIVE EXAMPLES 19 and 20

The ink compositions, the surface tensions, the viscosities, and the viscosity ratios of inks of Comparative Examples 19 and 20 are shown in Tables 35 and 36.

TABLE 35

| Comparative Example 19 | Black | Cyan |
| --- | --- | --- |
| Pure water | 43.7 | 58.5 |
| CAB-O-JET 300 black (carbon black pigment, produced by Cabot) | 33.3 | — |
| C.I. Direct Blue 199 | — | 2.5 |
| Triethylene glycol monobutyl ether | 3 | 3 |
| Glycerol | 20 | 36 |
| Viscosity (cps) | 2.7 | 3.0 |
| Viscosity ratio | 1.1 | |
| Surface tension (mN/m) | 45 | 46 |

TABLE 36

| Comparative Example 20 | Black | Cyan |
| --- | --- | --- |
| Pure water | 38.7 | 58.5 |
| CAB-O-JET 300 black (carbon black pigment, produced by Cabot) | 33.3 | — |
| C.I. Direct Blue 199 | — | 2.5 |
| Triethylene glycol monobutyl ether | 3 | 3 |
| Glycerol | 25 | 36 |
| Viscosity (cps) | 3.1 | 3.0 |
| Viscosity ratio | 1.0 | |
| Surface tension (mN/m) | 45 | 46 |

The inks were prepared, in which the composition of the cyan ink in Examples 15 and 16 was not changed, the viscosity of the black ink was increased by adjusting the amount of glycerol in the black ink, and the viscosity ratio was less than 1.3 (the compositions of the black inks were the same as those used in Comparative Examples 1 and 2).

The respective materials were sufficiently mixed and agitated for the ink compositions of Examples 1 to 16 and Comparative Examples 1 to 20, followed by performing filtration with a membrane filter of 0.8 μm to use the obtained inks for the evaluation of recording.

The recording was performed with the black inks and the yellow inks by using a recording apparatus having a multi-head of the on-demand type (discharge orifice diameter: 35 μm, resistance value of heating resistor: 150 Ω, driving voltage: 30 V, frequency: 2 KHz) for performing the recording by generating droplets by applying the thermal energy to the ink in the recording head, and a recording apparatus having a multi-head of the on-demand type (discharge orifice diameter: 40 μm, driving voltage: 30 V, frequency: 10 KHz) for performing the recording by generating droplets by applying the pressure to the ink in the recording head by means of the vibration of a piezoelectric element. The recording sample was composed of a portion which included only single color letters without any background, and a portion in which colors were combined so that the letter color and the background color were formed by two color inks having different colors respectively. The evaluation was directed to the distinction of letters and the disturbance of lines due to any blurring of the ink at the single color portion, and the distinction of letters and the blurring at the boundary at which the colors might be mixed with each other. As for the size of the recorded letters, the letter size was set to 11 point with Microsoft Word 97. The recording was performed by using regular paper (Xerox 4200) and regenerated paper (NEW SPEED HERB-100, abbreviation: SH100, produced by Tokai-Pulp & Paper Co., Ltd.) on which the feathering and the color bleed generally tend to occur as compared with regular paper. The recording was performed in the same manner as described above with the comparative inks as well.

Table 37 shows results of the evaluation of the recording samples obtained when the printing was performed on the regular paper (Xerox 4200).

TABLE 37

Results of Evaluation of Feathering and Color Bleed on XEROX 4200 Paper

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 |
|---|---|---|---|---|---|---|---|---|---|---|---|---|---|---|---|
| Feathering (black ink) | ++ | ++ | ++ | ++ | ++ | ++ | ++ | ++ | ++ | ++ | ++ | ++ | ++ | ++ | ++ |
| Feathering (color ink) | ++ | ++ | ++ | ++ | ++ | ++ | ++ | ++ | ++ | ++ | ++ | ++ | ++ | ++ | ++ |
| Color bleed | ++ | ++ | ++ | ++ | ++ | ++ | ++ | ++ | + | + | ++ | ++ | ++ | ++ | ++ |
| Overall evaluation | ++ | ++ | ++ | ++ | ++ | ++ | ++ | ++ | + | + | ++ | ++ | ++ | ++ | ++ |

| | Ex. 16 | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|---|---|---|---|---|---|
| Feathering (black ink) | ++ | ++ | ++ | ++ | − | − | ++ | ++ | ++ | ++ | ++ | ++ | ++ |
| Feathering (color ink) | ++ | ++ | ++ | ++ | ± | ± | ± | ++ | ++ | ++ | ++ | ± | ± |
| Color bleed | ++ | − | − | − | + | ± | − | − | − | − | − | − | − |
| Overall evaluation | ++ | − | − | − | − | − | − | − | − | − | − | − | − |

| | Comp. Ex. 13 | Comp. Ex. 14 | Comp. Ex. 15 | Comp. Ex. 16 | Comp. Ex. 17 | Comp. Ex. 18 | Comp. Ex. 19 | Comp. Ex. 20 |
|---|---|---|---|---|---|---|---|---|
| Feathering (black ink) | ++ | ++ | ++ | ++ | ++ | ++ | ++ | ++ |
| Feathering (color ink) | ++ | ++ | ++ | ++ | ++ | ++ | ++ | ++ |
| Color bleed | − | − | − | − | − | − | − | − |
| Overall evaluation | − | − | − | − | − | − | − | − |

Table 38 shows results of the evaluation of the recording samples obtained when the printing was performed on the regenerated paper (SH100).

TABLE 38

Results of Evaluation of Feathering and Color Bleed on SH100 Paper

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 |
|---|---|---|---|---|---|---|---|---|---|---|---|---|---|---|---|
| Feathering (black ink) | + | + | ++ | ++ | ++ | ++ | + | + | + | + | + | + | + | + | + |
| Feathering (color ink) | ++ | ++ | ++ | ++ | ++ | ++ | ++ | ++ | ++ | ++ | ++ | ++ | ++ | ++ | ++ |
| Color bleed | ++ | ++ | ++ | ++ | + | + | + | + | ± | ± | ++ | ++ | ++ | ++ | ++ |
| Overall evaluation | + | + | ++ | ++ | + | + | + | + | + | + | + | + | + | + | + |

| | Ex. 16 | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|---|---|---|---|---|---|

TABLE 38-continued

Results of Evaluation of Feathering and Color Bleed on SH100 Paper

| Feathering (black ink) | + | + | + | + | − | − | + | + | + | + | + | + | + |
|---|---|---|---|---|---|---|---|---|---|---|---|---|---|
| Feathering (color ink) | ++ | ++ | ++ | ++ | − | − | − | ++ | ++ | ++ | ++ | + | + |
| Color bleed | ++ | − | − | − | ± | − | − | − | − | − | − | − | − |
| Overall evaluation | + | − | − | − | − | − | − | − | − | − | − | − | − |

|  | Comp. Ex. 13 | Comp. Ex. 14 | Comp. Ex. 15 | Comp. Ex. 16 | Comp. Ex. 17 | Comp. Ex. 18 | Comp. Ex. 19 | Comp. Ex. 20 |
|---|---|---|---|---|---|---|---|---|
| Feathering (black ink) | + | + | + | + | + | + | + | + |
| Feathering (color ink) | ++ | ++ | ++ | ++ | ++ | ++ | ++ | ++ |
| Color bleed | − | − | − | − | − | − | − | − |
| Overall evaluation | − | − | − | − | − | − | − | − |

The two types of the recording apparatuses were used to evaluate the printing in the present invention. Similar results were obtained with both of them.

The method for evaluating the feathering for the recording sample is described below. The evaluation criterion is as follows. ++: The feathering is scarcely observable, and the letters are vivid. +: The feathering slightly occurs, but the letters are sufficiently readable. ±: The feathering clearly occurs, but the letters are readable. −: The feathering clearly occurs, and it is difficult to read the letters.

The method for evaluating the color bleed for the recording sample is described below. The evaluation criterion is as follows. ++: The color bleed is scarcely observable, and the letters are equivalently vivid as compared with the letters with no background. +: The color bleed slightly occurs as compared with the letters with no background, but the letters are sufficiently readable. ±: The color bleed clearly occurs as compared with the letters with no background, but the letters are readable. −: The color bleed clearly occurs as compared with the letters with no background, and it is difficult to read the letters.

The method for the overall evaluation of the recording sample is described below. The evaluation criterion is as follows. ++: The evaluation of the feathering is ++, the evaluation of the color bleed is ++, and the letters are vivid. +: The evaluation of the feathering is ++, +, or ±, the evaluation of the color bleed is ++, +, or ±, and the letters are sufficiently readable. −: The evaluation of − is made in any one of the evaluation of the feathering and the evaluation of the color bleed, and it is difficult to read the letters in some portions.

The results of the evaluation of the printing are explained below.

In Examples 1 and 2 and Comparative Examples 1, 2, and 3, the surface tension at 25° C. was not less than 40 mN/m, the viscosity of the black ink was adjusted depending on the difference in amount of glycerol in the black ink, and only the viscosity ratio between the black ink and the color ink at 25° C. was changed. On this condition, the results of the overall evaluation of the printing on the regular paper XEROX 4200 were as follows. That is, in Example 1, the viscosity ratio was 1.5, and the evaluation result was ++. In Example 2, the viscosity ratio was 1.3, and the evaluation result was ++. In Comparative Example 1, the viscosity ratio was 1.0, it was unsuccessful to satisfy the color bleed, and the evaluation result was −. In Comparative Example 2, the viscosity ratio was 1.1, and the evaluation result was − in the same manner as in Comparative Example 1. In Comparative Example 3, the viscosity ratio was 0.6, and the evaluation result was − in the same manner as in Comparative Example 1. Further, the results of the overall evaluation of the printing on the regenerated paper SH100 were as follows. That is, in Example 1, the evaluation result was +. In Example 2, the evaluation result was +. In Comparative Example 1, it was unsuccessful to satisfy the color bleed in the same manner as in the case of the regular paper XEROX 4200, and the evaluation result was −. In Comparative Example 2, the evaluation result was − in the same manner as in Comparative Example 1. In Comparative Example 3, the evaluation result was − in the same manner as in Comparative Example 1. Although the printing quality was slightly inferior to that obtained in the case of the printing on the regular paper. However, the similar results were successfully obtained.

In Comparative Examples 4 and 5, the surface tension at 25° C. was 35 mN/m by adjusting the amount of triethylene glycol monobutyl ether with respect to the compositions of the black ink and the yellow ink in Examples 1 and 2, the viscosity of the black ink was adjusted depending on the difference in amount of glycerol in the black ink, and the viscosity ratio between the black ink and the color ink at 25° C. was changed. On this condition, the results of the overall evaluation of the printing on the regular paper XEROX 4200 were as follows. That is, in Example 1, the viscosity ratio was 1.5, and the evaluation result was ++. In Example 2, the viscosity ratio was 1.3, and the evaluation result was ++. In Comparative Example 4, the viscosity ratio was 1.6, it was unsuccessful to satisfy the feathering for both of the black ink and the color ink, and the evaluation result was −. In Comparative Example 5, the viscosity ratio was 1.1, and the evaluation result was − in the same manner as in Comparative Example 4. Further, the results of the overall evaluation of the printing on the regenerated paper SH100 were as follows. That is, in Example 1, the evaluation result was +. In Example 2, the evaluation result was +. In Comparative Example 4, it was unsuccessful to satisfy the feathering for both of the black ink and the color ink in the same manner as in the case of the regular paper XEROX 4200, and the evaluation result was −. In Comparative Example 5, the evaluation result was − in the same manner as in Comparative Example 4. Although the printing quality was slightly inferior to that obtained in the case of the printing on the regular paper XEROX 4200. However, the similar results were successfully obtained even in the case of the regenerated paper SH100.

According to the results described above, it is affirmed that the condition, in which both of the requirements for the feathering and the color bleed are satisfied, is as follows. That is, the surface tension at 25° C. is not less than 40 mN/m, and the viscosity ratio is not less than 1.3.

Further, the similar results were also obtained in other Examples and Comparative Examples. According to the results described above, it is affirmed that the condition, in which both of the requirements for the feathering and the color bleed of the black ink and the color ink are satisfied, is as follows. That is, the surface tension at 25° C. is not less than 40 mN/m, and the viscosity ratio is not less than 1.3.

In respective Examples, in the case of the water base color ink sets for ink-jet recording constructed according to the present invention, i.e., in the case of the water base color ink sets for ink-jet recording in which both of the surface tensions at 25° C. of the black ink and the color ink were not less than 40 mN/m, and the viscosity ratio between the black ink and the color ink was not less than 1.3, the satisfactory results for the feathering and the excellent results for the color bleed were successfully obtained with the black ink and the color ink respectively. On the other hand, in Comparative Examples constructed contrarily to the present invention, any problem arose in any one of the feathering and the color bleed of the black ink and the color ink, and it was impossible to obtain any satisfactory printing quality.

An embodiment of an ink jet printer as an ink-jet recording apparatus in accordance with the invention will be described as below with reference to the accompanying drawings.

As shown in FIG. 1, a color ink jet printer 100 includes four ink cartridges (ink set) 61, each of which contains a respective color of ink, such as cyan, magenta, yellow and black ink, a head unit 63 having an ink jet printer head 6 (hereinafter referred to as a head 6) for ejecting ink onto a sheet 62, a carriage 64 on which the ink cartridges 61 and the head unit 63 are mounted, a drive unit 65 that reciprocates the carriage 64 in a straight line, a platen roller 66 that extends in a reciprocating direction of the carriage 64 and is disposed opposite to the head 6, and a purge unit 67. As the black, cyan, magenta and yellow ink, the ink prepared in the above examples can be used.

The drive unit 65 includes a carriage shaft 71, a guide plate 72, two pulleys 73 and 74, and an endless belt 75. The carriage shaft 71 is disposed at a lower end portion of the carriage 64 and extends in parallel with the platen roller 66. The guide plate 72 is disposed at an upper end portion of the carriage 64 and extends in parallel with the carriage shaft 71. The pulleys 73 and 74 are disposed at both end portions of the carriage shaft 71 and between the carriage shaft 71 and the guide plate 72. The endless belt 75 is stretched between the pulleys 73 and 74.

As the pulley 73 is rotated in normal and reverse directions by a motor, the carriage 64, connected to the endless belt 75, is reciprocated in the straight direction, along the carriage shaft 71 and the guide plate 72, in accordance with the normal and reverse rotation of the pulley 73.

The sheet 62 is supplied from a sheet cassette (not shown) provided in the ink jet printer 100 and fed between the head 6 and the platen roller 66 to perform predetermined printing by ink droplets ejected from the head 6. Then, the sheet 62 is discharged to the outside. A sheet feeding mechanism and a sheet discharging mechanism are omitted from FIG. 1.

The purge unit 67 is provided on a side of the platen roller 66. The purge unit 67 is disposed to be opposed to the head 6 when the head unit 63 is located in a reset position. The purge unit 67 includes a purge cap 81, a pump 82, a cam 83, and a waste ink reservoir 84. The purge cap 81 contacts a nozzle surface to cover a plurality of nozzles (described later) formed in the head 6. When the head unit 63 is placed in the reset position, the nozzles in the head 6 are covered with the purge cap 81 to inhale ink including air bubbles trapped in the head 6 by the pump 82 and by the cam 83, thereby purging the head 6. The inhaled ink is stored in the waste ink reservoir 84.

To prevent ink from drying, a cap 85 is provided to cover the nozzles 15 (FIG. 2) in the head 6 mounted on the carriage 64 when it returns to the reset position after printing.

Figure 2:
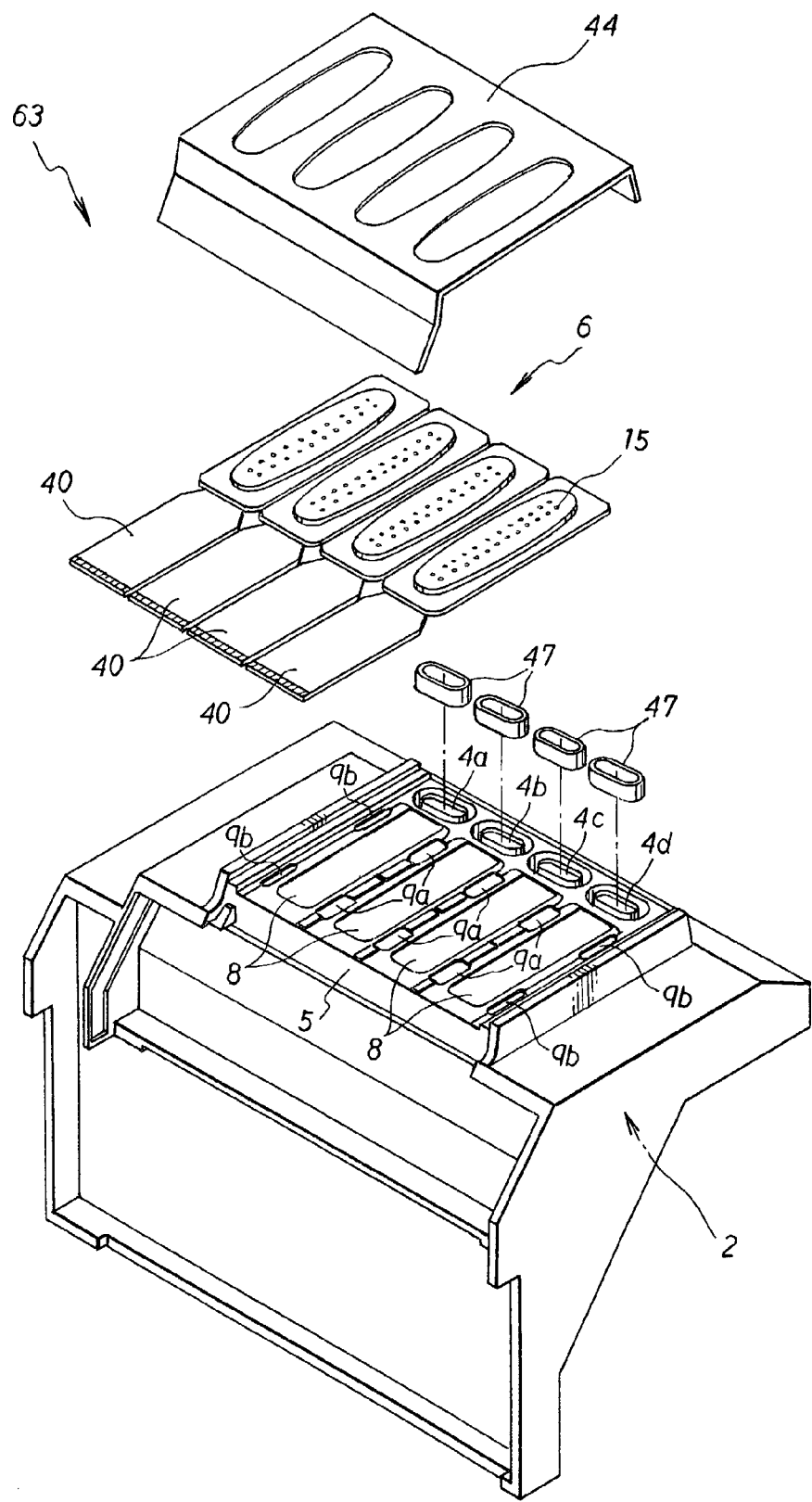
FIG. 2 is a perspective view of a head unit, with its nozzles facing upward.

As shown in FIG. 2, the head unit 63 is mounted on the carriage 64 that moves along the sheet 62 and has a substantially box shape with upper open structure. The head unit 63 has a cover plate 44 made of an elastic thin metallic plate. The cover plate 44 is fixed at the front surface of the head unit 63 and covers the head unit 63 when the head 6 is removed. The head unit 63 also has a mounting portion 2 on which the four ink cartridges 61 are detachably attached from above. Ink supply paths 4a, 4b, 4c, 4d, each of which connects respective ink discharge portions of each ink cartridge 61, communicate with a bottom of a bottom plate 5 of the head unit 63. Each of the ink supply paths 4a, 4b, 4c, 4d is provided with a rubber packing 47 to intimately contact an ink supply hole 19a.

The head 6 is constructed from four blocks that are arranged in parallel to each other. On the underside of the bottom plate 5, four stepped supports 8 are formed to receive the respective blocks of the head 6. In the bottom plate 5, a plurality of recesses 9a, 9b, which are filled with an UV adhesive to bond the respective blocks of the head 6, are formed to penetrate the bottom plate 5.

Figure 3:
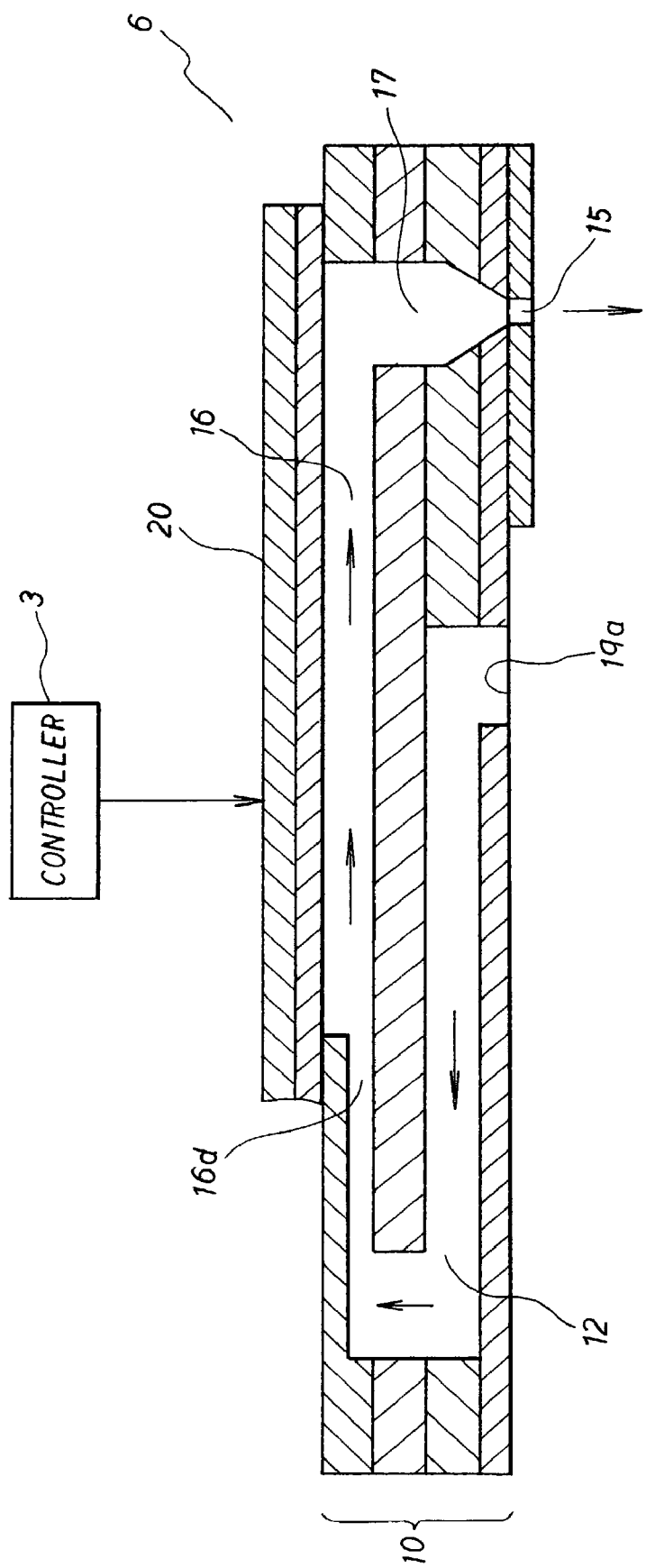
FIG. 3 is a schematic diagram showing the ink jet print head and a controller.

FIG. 3 is a sectional view showing one of the pressure chambers in the head 6. A plurality of pressure chambers 16 are provided in the head 6. The nozzles 15 communicating the respective pressure chambers 16 are provided substantially in line in one surface of the head 6.

As shown in FIG. 3, the head 6 is constructed by the cavity plate 10 and the piezoelectric actuator 20. The cavity plate 10 has the ink supply holes 19a connected with the ink cartridge 61, the manifolds 12, the narrowed portions 16d, the pressure chambers 16, the through holes 17 and the nozzles 15, which communicate with each other. While the ink supply hole 19a opens toward the ejecting direction of the nozzle 15 in FIG. 3 for convenience, the ink supply hole 19a actually opens toward the piezoelectric actuator 20.

A controller 3 provides a prestored driving pulse to the piezoelectric actuator 20 by superimposing the driving pulse on a clock signal. The driving pulse can be controlled with a technique disclosed in, for example, U.S. Pat. Nos. 6,312,089, 6,412,923 and 6,460,959. Further, the detailed structure of the printer and controlling method of the head unit are also disclosed in these U.S. patents, a content of which has been incorporated herein by reference.

The present invention is not limited to Examples described herein, which can be carried out even when the material substances, the amounts thereof, and the preparation conditions to be used are changed within the ranges as described above.

As clarified from the facts explained above, the water base ink set for ink-jet recording comprising the black ink and the color ink is characterized in that both of the surface tensions at 25° C. of the black ink and the color ink are not less than 40 mN/m, and the viscosity ratio between the black ink and the color ink (viscosity of the color ink/viscosity of the black ink) is not less than 1.3. Therefore, the feathering and the color bleed are simultaneously avoided for the black ink and the color ink, and it is possible to perform the vivid color recording.

What is claimed is:

1. An ink set for ink-jet recording, comprising:
   a black ink which has a surface tension of not less than 40 mN/m at 25° C. and has a pigment as a coloring agent; and
   a color ink which has a surface tension of not less than 40 mN/m at 25° C. and has a dye as a coloring agent, wherein:
   a viscosity ratio of the color ink with respect to the black ink is not less than 1.3.

2. The ink set according to claim 1, wherein the surface tensions of the color ink and the black ink are not less than 45 mN/in at 25° C.

3. The ink set according to claim 1, wherein the color ink has a viscosity of 2.0 to 11.0 cps, and the black ink has a viscosity of 1.0 to 8.0 cps.

4. The ink set according to claim 1, wherein each of the black ink and the color ink contains a coloring agent, water, and a water-soluble organic solvent.

5. The ink set according to claim 4, wherein each of the black ink and the color ink further contains a surface tension-adjusting agent.

6. The ink set according to claim 4, wherein the water-soluble organic solvent is glycerol.

7. The ink set according to claim 1, wherein the color ink has an yellow ink, a magenta ink and a cyan ink, each of which has a surface tension of not less than 40 mN/m at 25 C, and a viscosity ratio of the each of the yellow ink, the magenta ink and the cyan ink with respect to the black ink is not less than 1.3.

8. The ink set according to claim 7, wherein the ink set is in a form of ink cartridge.

9. An ink-jet recording apparatus comprising:
   an ink-jet head;
   an ink tank which accommodates an ink to be supplied to the ink-jet head; and
   an ink set as defined in claim 1 which is accommodated in the ink tank.

10. The ink-jet recording apparatus according to claim 9, wherein the ink tank is in a form of ink cartridge.

11. The ink set according to claim 4, wherein the water-soluble organic solvent ranges from 10 to 40% by weight.

12. The ink set according to claim 1, wherein each of the black ink and the color ink comprises triethylene glycol monobutyl ether.

13. The ink set of claim 1, wherein the color ink is one of an yellow ink, a magenta ink and a cyan ink.

14. The ink set according to claim 1, wherein the black ink has a solvent and the color ink has the same solvent as that of the black ink.

15. An ink set for ink-jet recording, comprising:
   a black ink which has a surface tension of not less less than 40 mN/m at 25° C. and has a pigment as a coloring agent; and
   a color ink which has a surface tension of not less than 40 mN/m at 25° C. and has a dye as a coloring agent, wherein:
   a viscosity ratio of the color ink with respect to the black ink is not less than 1.3; and
   the black ink consists essentially of the pigment, water and a water-soluble organic solvent.

16. An ink set for ink-jet recording, comprising:
   a black ink which has a surface tension of not less than 40 mN/m at 25° C. and has a pigment as a coloring agent and triethylene glycol monobutyl ether; and
   a color ink which has a surface tension of not less than 40 mN/m at 25° C. and has a dye as a coloring agent and triethylene glycol monobutyl ether, wherein:
   a viscosity ratio of the color ink with respect to the black ink is not less than 1.3.

* * * * *